H. P. HOOD.
SHOCK ABSORBER.
APPLICATION FILED JULY 19, 1920.
1,385,872.
Patented July 26, 1921.
2 SHEETS—SHEET 1.
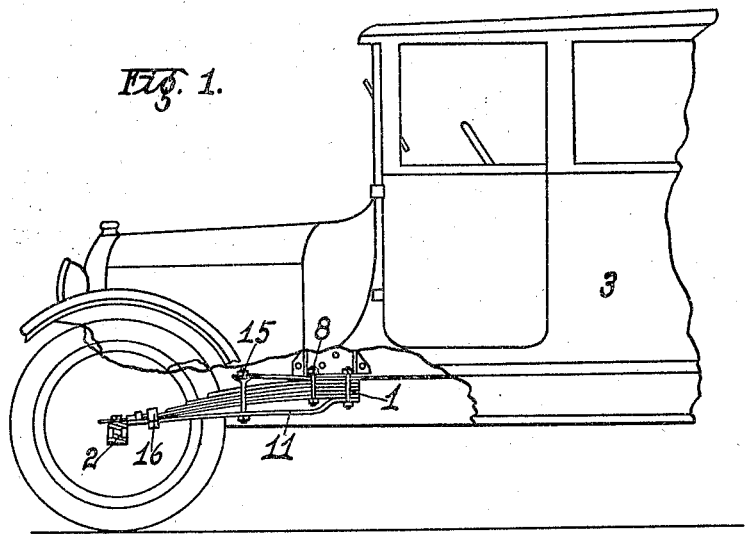
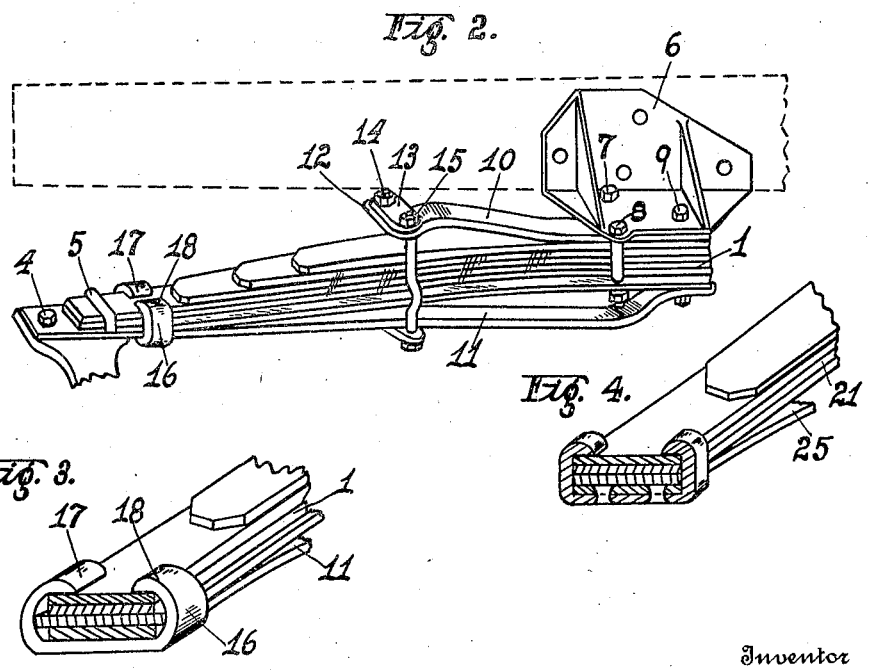
Inventor
Houston P. Hood.
By Harry C. Schroeder
Attorney H. P. HOOD.
SHOCK ABSORBER.
APPLICATION FILED JULY 19, 1920.
1,385,872. Patented July 26, 1921.
2 SHEETS—SHEET 2.
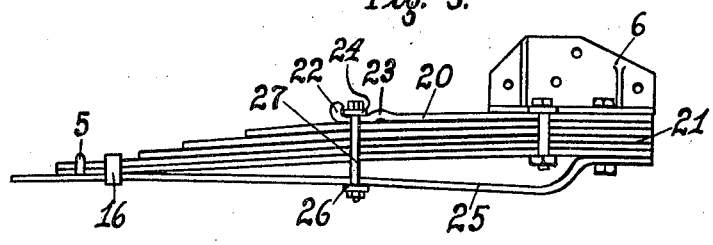
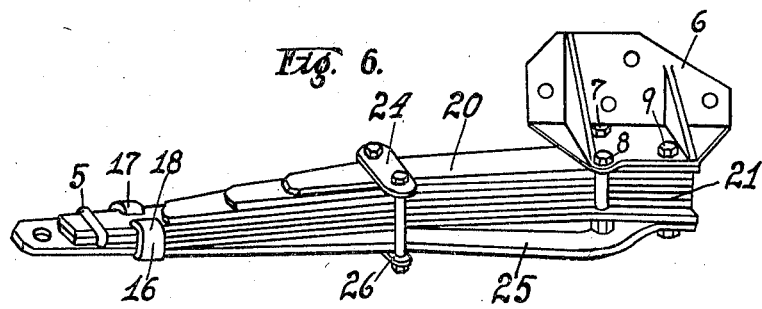
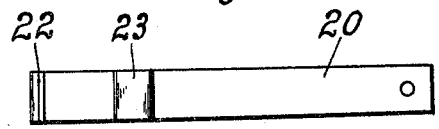
Inventor
Houston P. Hood.
By Harry G. Schroeder
Attorney

UNITED STATES PATENT OFFICE.

HOUSTON P. HOOD, OF SAN FRANCISCO, CALIFORNIA.

SHOCK-ABSORBER.

1,385,872.  Specification of Letters Patent.  Patented July 26, 1921.

Application filed July 19, 1920. Serial No. 397,411.

*To all whom it may concern:*

Be it known that I, HOUSTON P. HOOD, a citizen of the United States, residing at San Francisco, in the county of San Francisco and State of California, have invented certain new and useful Improvements in Shock-Absorbers, of which the following is a specification.

This invention relates to a shock absorber for vehicle springs of the type known as cantaliver springs, and its object is to provide means whereby the action of such springs will be improved.

A further object of the invention is to provide a device of the character described which will be capable of being applied to the cantaliver spring with practically no change in the present mode of support of such springs, thereby making it possible to apply this apparatus to any machine now in use with the minimum of labor.

Other objects of the invention will appear as the description proceeds.

In the drawings in which the same reference numeral is applied to the same portion throughout, Figure 1 is a side elevation of a portion of a vehicle showing a cantaliver spring having this shock absorber applied thereto.

Fig. 2 is a perspective view on a larger scale of the spring used as a shock absorber shown in Fig. 1.

Fig. 3 is a sectional view at the end of the spring showing the manner of securing the shock absorber to the spring.

Fig. 4 is a perspective view of a portion of a spring showing the shock absorber thereto and illustrating springs all of the same width.

Fig. 5 is a side elevation of a spring having this shock absorber attached thereto, the upper spring of the shock absorber lying parallel with the upper leaf of the spring.

Fig. 6 is a perspective view of modified form of shock absorber with the upper spring lying parallel with the upper leaf of the spring.

Fig. 7 is a side view of the upper spring.

Fig. 8 is a top plan view of the same.

In the drawings the numeral 1 indicates the cantaliver spring, which spring is secured to the axle 2 of the vehicle 3 with suitable bolts as indicated at 4 and 5. The cantaliver spring 1 is secured to the vehicle in any suitable way, but in the present instance a bracket 6 is used, suitable bolts 7, 8 and 9 connecting the spring to the bracket.

This shocker absorber consists of two springs 10 and 11, the former of which has a hook at 12 to receive a cross yoke 13 secured thereto by means of two bolts 14 and 15. The lower spring 11 is provided with a transversely extending strap 16 which has its ends 17 and 18 hammered down over the top of the spring adjacent to the axle. This securing clip is fastened to the spring 11 by any suitable means, preferably by the rivet shown in Fig. 4. The ends of both the springs 10 and 11 are rigidly secured to the spring 1 which consists of a plurality of leaves and to the bracket 6 in the same manner that the spring is secured thereto after the bolts 14 and 15 are tightened to bring such a strain to bear upon the springs 10 and 11 as is deemed desirable.

In the form of the invention shown in Figs. 4 and 5 a flat spring 20 is applied to the main spring 21, and this flat spring is provided with a hooked end 22 and ridge 23 to hold the bolt yoke 24 in place. Beneath the spring is the auxiliary spring 25 which is put under such stress as may be necessary by means of the yoke 26 on the lower end of the bolts to 27 on both sides of the spring 21.

In the form of my invention shown in Fig. 6, the upper spring 20 lies against the upper leaf of the cantaliver spring and is the same general shape. The construction is similar to the form shown in Figs. 4 and 5 with the exception that the spring 20 is flat.

As shown in Figs. 7 and 8, the spring 20 may be tapered at the end through which it is secured to give it greater flexibility.

In operation the bolts are tightened until the pressure upon the spring 11 or 25 is sufficiently accurate to reduce the number of vibrations of the vehicle body as the vehicle passes over rough places in the road.

It will be understood by those skilled in the art that while this shock absorber has been shown in connection with one kind of vehicle that it is applicable to any kind, having cantaliver springs applied thereto.

In operation, the bolts 14 and 15 are tightened on the member 11 sufficiently to cause it to reduce the period of vibration of the main spring thereby causing the car to ride easier.

Having described my invention, I claim:

1. A cantaliver spring shock absorber comprising a cantaliver spring, a supplementary spring member rigidly secured to the cantaliver spring at its thickest end, the latter member extending toward the thinner end of the cantaliver spring and spaced therefrom, and a yoke extending over the cantaliver spring near a mid-point thereof and straining the supplementary spring.

2. A cantaliver spring shock absorber comprising a cantaliver spring, a supplementary spring member rigidly connected to the cantaliver spring at its thickest portion, and extending toward the thinner end of the cantaliver spring at a distance therefrom, a yoke bearing upon the supplementary spring to pass over the cantaliver spring, and means to hold the yoke in a fixed position with respect to the cantaliver spring.

3. A cantaliver spring shock absorber comprising a cantaliver spring, a supplementary spring rigidly connected thereto at the thickest end thereof and extending toward the thinner end of the spring at a distance therefrom, means to hold the supplementary spring and cantaliver spring together at the thinnest end of the cantaliver spring, and a yoke passing around both of said springs and stressing the supplementary spring.

4. A cantaliver spring shock absorber comprising a cantaliver spring, a supplementary spring rigidly connected to the cantaliver spring at its thickest end and extending toward the position end of the cantaliver spring at a distance therefrom, means to connect the two springs together at the thinnest end of the cantaliver spring, a yoke holder rigidly connected to the cantaliver spring at its thickest end, and a yoke passing around the yoke holder and under the supplementary spring and stressing the latter to reduce the vibrations of the cantaliver spring.

In testimony whereof I affix my signature.

HOUSTON P. HOOD.